United States Patent [19]
Inaba

[11] Patent Number: 5,836,665
[45] Date of Patent: Nov. 17, 1998

[54] STEREO-SLIDE MOUNT

[76] Inventor: Minoru Inaba, No. 1116, Oaza Samukawa, Oyama-shi, Tochigi-ken, Japan

[21] Appl. No.: 548,586

[22] Filed: Oct. 26, 1995

[51] Int. Cl.⁶ .................................................. G03B 21/14
[52] U.S. Cl. .............................. 353/120; 40/701; 40/705
[58] Field of Search .............................. 353/120, DIG. 2, 353/DIG. 5, 7, 9; 40/701, 704, 705, 706, 707, 710, 729

[56] References Cited

U.S. PATENT DOCUMENTS

| | | | |
|---|---|---|---|
| 2,739,401 | 3/1956 | Balter | 40/705 |
| 2,823,478 | 2/1958 | Ostergaard et al. | 40/707 |
| 3,133,368 | 5/1964 | Perrot | 40/701 |
| 3,235,991 | 2/1966 | Harper et al. | 40/707 |
| 4,431,282 | 2/1984 | Martin geb. Böser | 353/120 |
| 5,392,548 | 2/1995 | Truc et al. | 40/705 |

*Primary Examiner*—William Dowling
*Attorney, Agent, or Firm*—Fattibene and Fattibene; Paul A. Fattibene; Arthur T. Fattibene

[57] ABSTRACT

A stereo slide mount which facilitates correct mounting of stereo slides to utilize the advantage of a stereo camera having a function for correcting parallax. The front-side mount frame 11 and the back-side mount frame 12 are provided with windows 13L, 13R, 14L and 14R maintaining a pitch nearly equal to the gap between two human eyes. The windows have vertical and lateral sizes which are slightly larger than the screen region of the slide film F. Positioning pins 15 are provided at upper, lower, right and left portions of the windows 14L, 14R of the back-side mount frame 12, and holes 16 are formed in the front-side mount frame 11 to correspond to the pins 15. The film is positioned while bringing perforations of the slide film F into engagement with the pins 15 which are then forcibly introduced into the holes of the front-side mount frame 11, in order to join the front-side and back-side mount frames 11 and 12 together.

7 Claims, 6 Drawing Sheets

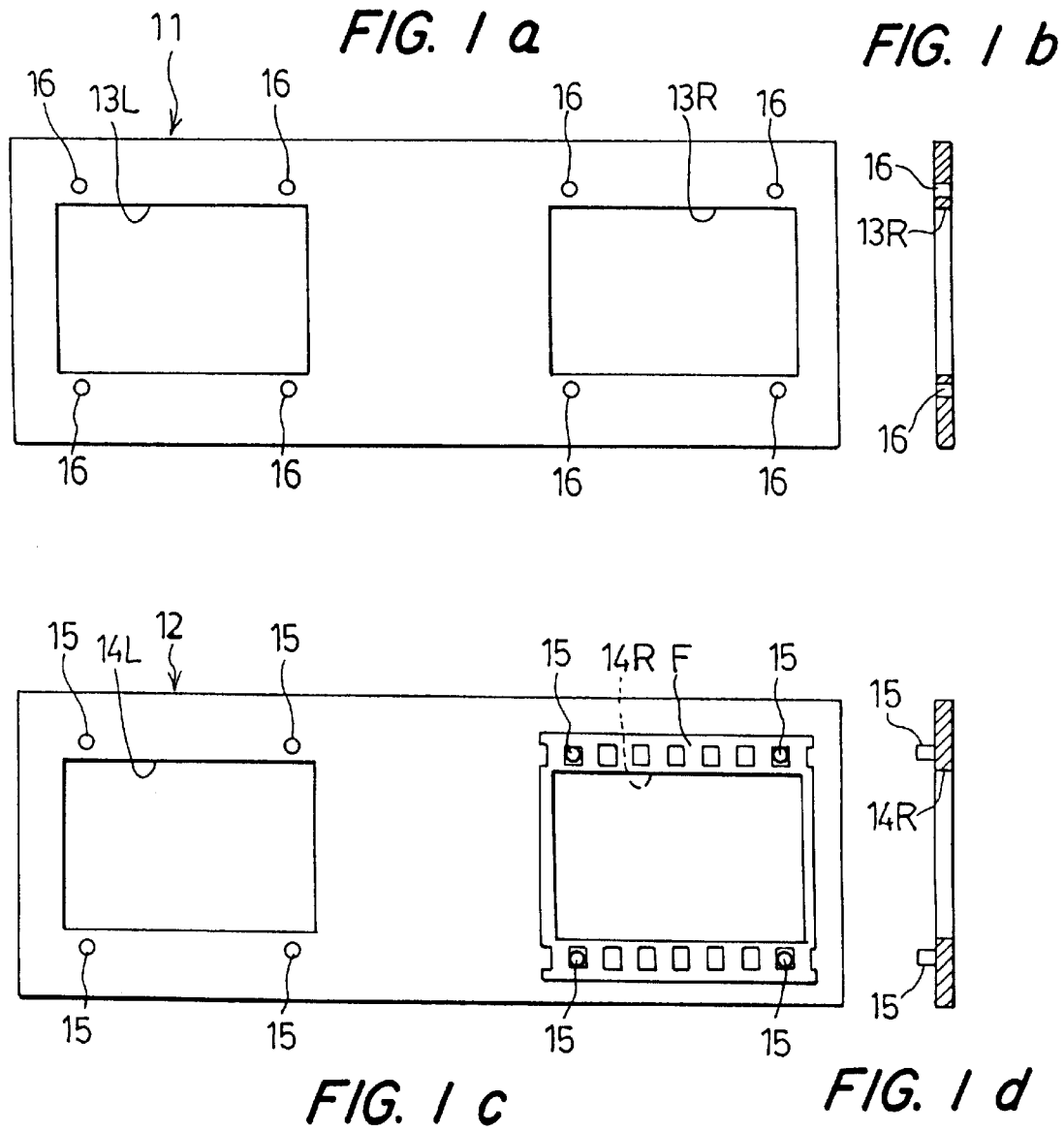

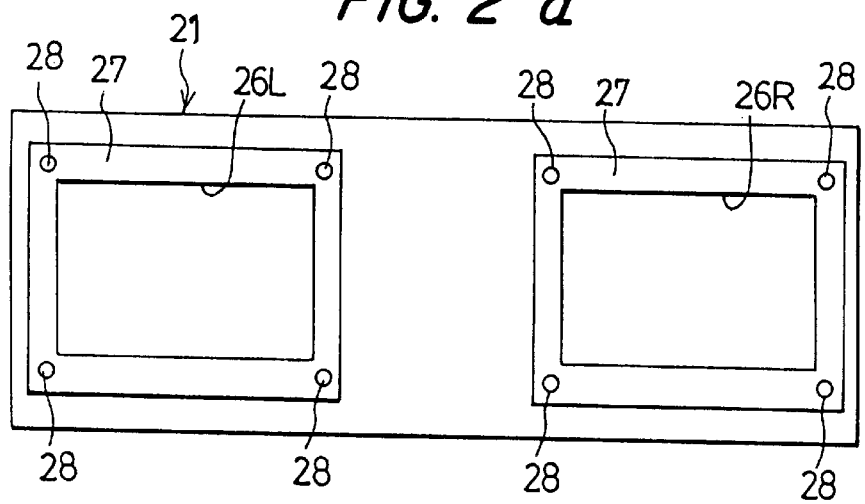
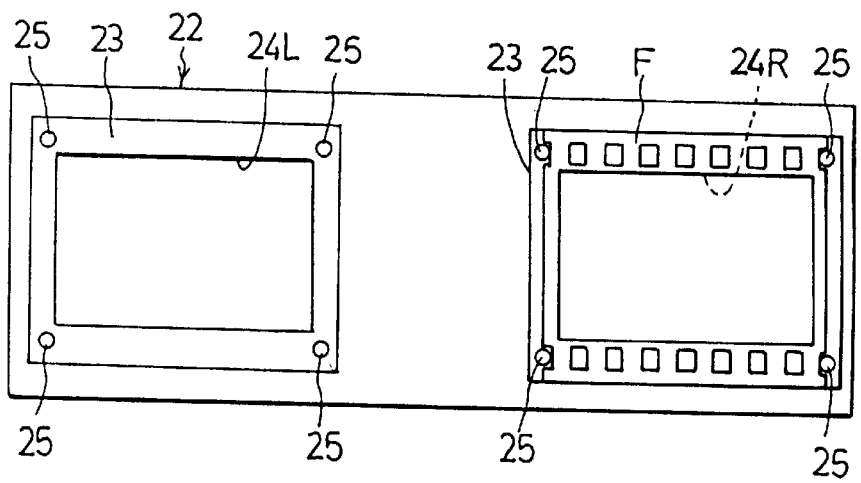
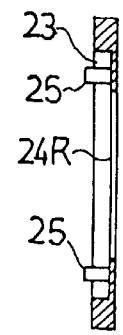

STEREO-SLIDE MOUNT

BACKGROUND OF THE INVENTION

The present invention relates to a slide mount for mounting slide films and, particularly, to a stereo slide mount for mounting stereo slides of a set of two pieces.

DESCRIPTION OF THE PRIOR ART

A conventional stereo slide mount will be described below with reference to FIG. 4. The stereo slide mount 1 shown here is made of a paper. The upper half portion is folded toward this side along a folding line 2 located midway in the up-and-down direction, and a front-side mount frame 3 of the upper half portion and the back-side mount frame 4 of the lower half portion are adhered together.

Right and left windows 5R, 5L, 6R and 6L are perforated in the front-side mount frame 3 and in the back-side mount frame 4, the windows being symmetrically disposed up and down with the folding line 2 as an axis of symmetry.

On the upper and lower portions of the windows 6L, 6R of the lower side are printed reference lines 7 and 8 that serve as markers of upper and lower positions of the slide films. The left slide of a pair of stereo slides cut after each frame is positioned being fitted to the left lower window 6L and is adhered along the edge portions thereof. Similarly, the right slide is positioned being fitted to the right lower window 6R and is adhered. Thereafter, the upper and lower mount frames 3 and 4 are folded and adhered together.

FIG. 5 illustrates a pair of right and left stereo slides 9R and 9L photographed by using a conventional stereo camera. The left slide 9L has a portion at its left end of the screen and the right slide 9R has a portion at its right end of the screen that are not overlapped one upon the other due to a difference in the visual field of the right and left photographing lenses of the stereo camera. These non-overlapping portions 10L and 10R do not contribute to forming a solid image when the slides are viewed by using a stereo slide viewer but, instead, the edges of the other windows appear as vertical lines along the boundaries of the overlapping portions and the non-overlapping portions when they are viewed by two eyes as shown in FIG. 6. To prevent this, therefore, the windows 5 and 6 of the slide mount 1 have been formed in a width narrower than the size of the screen of the slide 9 to shield the above-mentioned non-overlapping portions 10L and 10R.

In order to obtain a suitable solid effect, furthermore, it is necessary to mount the slides on the stereo slide mount in a manner that the subject in a close-range view is located nearly at the same position of the right and left windows, to adjust the gap between the right and left slides, and to adjust the back and front positions of the subject that is viewed by two eyes.

In the stereo slides photographed by using a conventional stereo camera, an optimum gap between the right and left slides changes depending upon the distance to the subject in a close-range view that is photographed. If the gap between the right and left slides is incorrectly adjusted, the solid effect intended by the photographer is not obtained. Furthermore, the non-overlapping portions 10L and 10R increase with a decrease in the photographing distance. Therefore, there have been proposed stereo slide mounts having windows of several kinds of widths depending upon the photographing distance.

In order to eliminate the defect in the conventional stereo camera, the present applicant has proposed a stereo camera that is capable of adjusting the distance between the centers of the right and left photographing lenses (Japanese Patent Application No. 252229/1994). This stereo camera makes it possible to minimize the right and left non-overlapping portions by correcting parallax in the right and left screens irrespective of the distance to the subject that is to be photographed and, hence, to fount all stereo slides that are photographed maintaining a predetermined gap between the right and left slides.

In the conventional stereo slide mount without a reference of gap between the right and left slides, however, the slides may be mounted maintaining improper gap to offset the solid effect.

Besides, the windows have a narrow width with respect to the real screens to shield the non-overlapping portions of the right and left screens, losing screen areas to a large extent in the direction of width and making it difficult to sufficiently obtain the features of the stereo camera t hat has a parallax correction function which is capable of decreasing the right and left non-overlapping portions.

To mount the stereo slides photographed by the above-mentioned stereo camera on the stereo slide mount maintaining the solid effect equal to the one at the time of taking a picture and without losing screen areas, however, there arouse technical problems. The object of the present invention is to solve such technical problems.

SUMMARY OF THE INVENTION

The present invention was proposed to accomplish the above-mentioned object and provides a stereo slide mount in which the peripheral edges of the slide films are held from both the front and back surfaces by a pair of front-side and back-side mount frames having two rectangular windows which are formed in parallel to hold two pieces of the slide films, wherein pins are provided on one film-holding surface of the pair of mount frames to engage with perforations of two pieces of the slide films to position the slide films maintaining a predetermined gap, holes are formed in the film-holding surface of the other mount frame to correspond to said pins, and the pins and the holes of the front-side and back-side mount frames are fitted to each other to hold the slide films. The invention further provides a stereo slide mount in which the windows have vertical and lateral sizes which are larger than the size of the screens of the slide films, so that unexposed portions along the edges of the screens of said slide films are exposed.

Frames of slide films are placed on the right and left windows of the mount frame having the pins in a manner that the pins are inserted in the perforations of the films, so that the right and left slide films are positioned maintaining a predetermined gap. Another mount frame is then overlapped in a manner that the pins are fitted to the holes, thereby to join the front-side and back-side mount frames together.

The stereo slides which are so photographed that the right and left visual fields are in agreement by using a stereo camera having a parallax correction function, are mounted maintaining a predetermined gap to obtain an optimum solid effect irrespective of the photographing distance. By using the above-mentioned stereo slide mount, the stereo slides are set maintaining an optimum gap without any adjustment.

By mounting the stereo slides on the stereo slide mount in another embodiment, furthermore, there is no loss in the right and left screen areas, and a picture can be viewed maintaining an optimum solid effect which is nearly equal to the picture viewed through a view-finder at the time of taking a picture.

BRIEF DESCRIPTION OF THE DRAWINGS

FIG. 1 illustrates a stereo slide mount of the present invention, wherein FIG. 1(a) is a front view of a front-side mount frame, FIG. 1(b) is a sectional view of FIG. 1(a), FIG. 1(c) is a front view of a back-side mount frame, and FIG. 1(d) is a sectional view of FIG. 1(c);

FIG. 2 illustrates another embodiment of the present invention, wherein FIG. 2(a) is a front view of a front-side mount frame, FIG. 1(b) is a sectional view of FIG. 2(a), FIG. 2(c) is a front view of a back-side mount frame, and FIG. 2(d) is a sectional view of FIG. 2(c);

FIG. 3 illustrates a further embodiment of the stereo slide mount of the present invention, wherein FIG. 3(a) is a front expansion plan, and FIG. 3(b) is a sectional view of FIG. 3(a);

DESCRIPTION OF THE PREFERRED EMBODIMENTS

Figure 3:
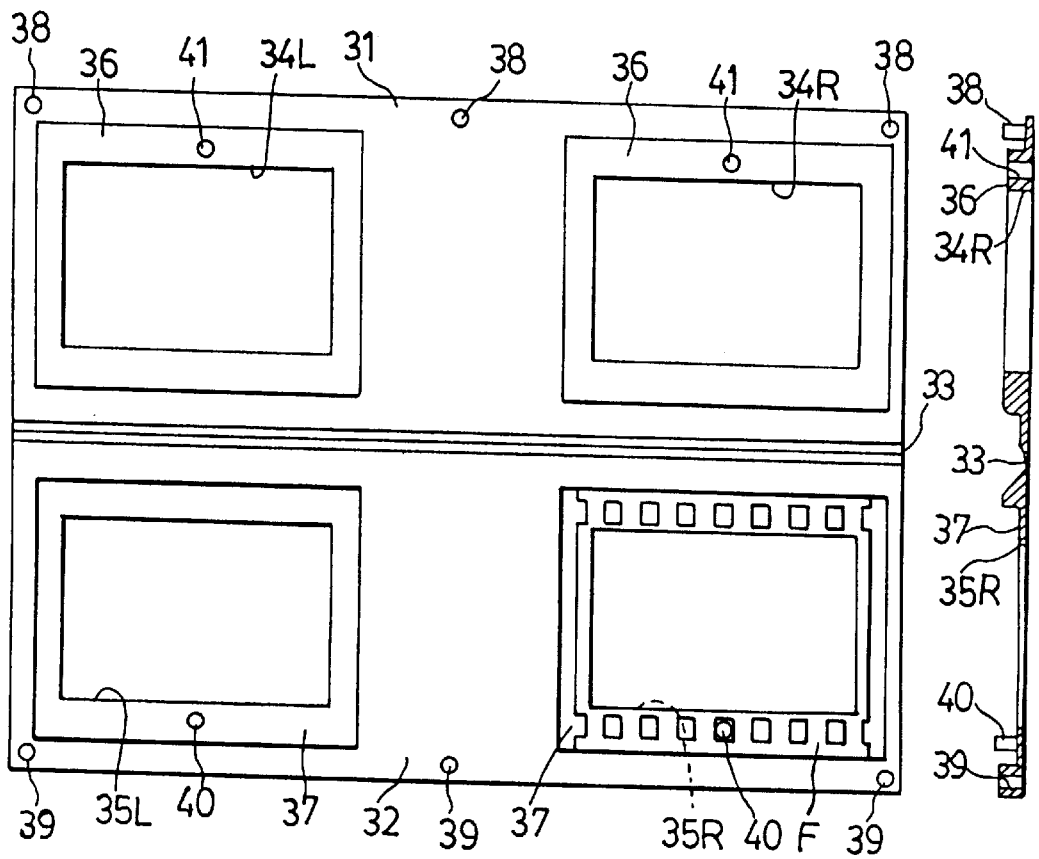
Figure 4:
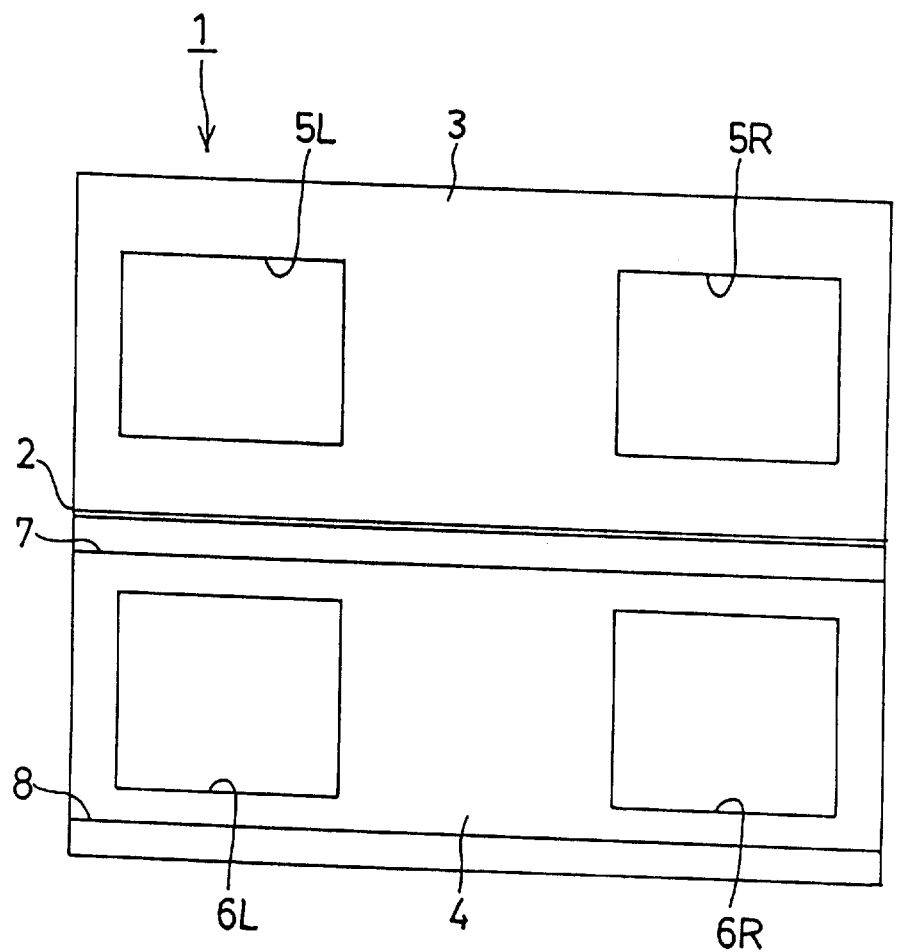
FIG. 4 is a front expansion plan of a conventional stereo slide mount.
Figure 5:
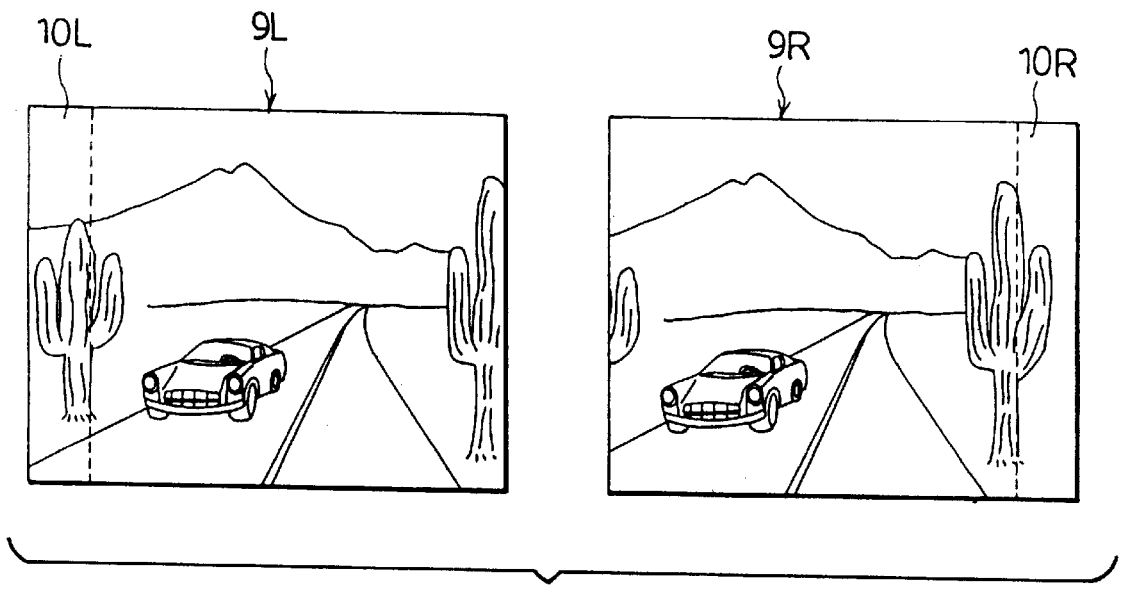
FIG. 5 is a diagram explaining stereo slides.
Figure 6:
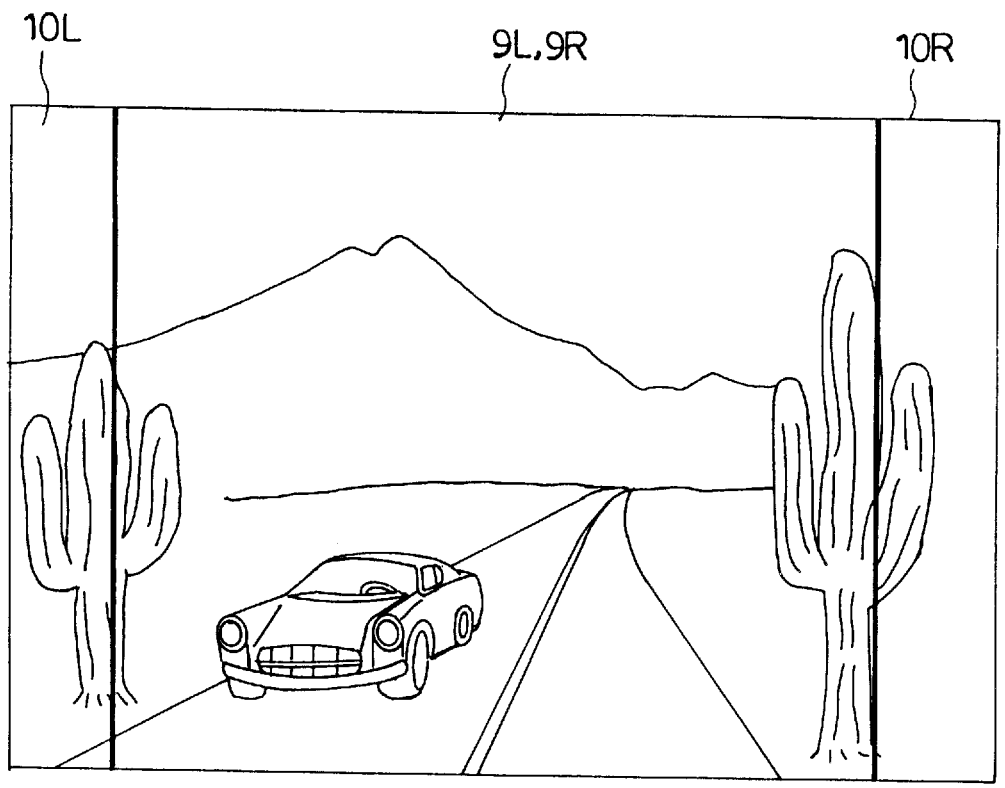
FIG. 6 is a diagram explaining a picture of when the stereo slides are viewed by two eyes.

Embodiments of the present invention will now be described in detail with reference to FIGS. 1 to 3. A slide mount shown in FIG. 1 is divided into two frames, i.e., a front-side mount frame 11 shown in FIGS. 1(a) and 1(b), and a back-side mount frame 12 shown in FIGS. 1(c) and 1(d), which are obtained by injection-molding a resin. In the front-side and back-side mount frames 11 and 12 are formed right and left windows 13R, 13L, 14R, 14L, the pitch between the right and left windows being set to be about 2.5 inches (63.5 mm) which is nearly equal to the pitch between the two human eyes. The windows 13 and 14 have vertical and lateral sizes which are slightly greater (by, for example, about 0.2 to 0.3 mm) than the photographed screen regions but without permitting perforation of the slide films F to be exposed.

On the back-side mount frame 12, cylindrical pins 15 are symmetrically studded at upper and lower positions on the right and left sides of the window to engage with the perforation of the slide film F. In the front-side mount frame 11 are formed holes 16 at symmetrical positions to engage with the pins 15 of the back-side mount frame 12.

The pins 15 and holes 16 are formed surrounding the window maintaining pitches in the up-and-down direction and in the right-and-left direction based upon the perforation of the slide film F. By bringing the upper, lower, right and left perforations of a frame of slide film F into engagement with the pins 15, the vertical and lateral positions of the slide film F are determined.

The positional relationships of the pins 15, holes 16 and windows 13, 14 are the same as the positional relationships of the exposed screen in the stereo camera and perforations of the slide film F, By bringing the upper, lower, right and left perforations of a frame of slide film F into engagement with the pins 15 at four places on the back-side mount frame 12, the central point of the window 14R is brought into agreement with the central point of the screen of the slide film F, and unexposed black portions along the peripheral edges of the screen appear in the window 14R uniformly on the upper, lower, right and left sides.

The left slide of the stereo slides is fitted onto the left window 14L of the back-side mount frame 12, the right slide is fitted onto the right window 14R, the front-side mount frame 11 is overlapped, and the pins 15 and the holes 16 are fitted to each other, so that the front-side and back-side mount frames 11 and 12 are joined together.

The stereo slide mount shown in FIG. 2 comprises two members, i.e., a front-side mount frame 21 and a back-side mount frame 22 like those of FIG. 1, the back-side mount frame 22 having rectangular recessed portions 23 formed on the right and left side thereof maintaining a vertical size equal to that of the slide film F and a lateral size which is longer than that of a frame of slide film F and, further, having windows 24L and 24R formed at the centers of the recessed portions 23. The pitch of the pins 25 in the up-and-down direction is equal to the pitch between the center points of perforations of the slide film F in the up-and-down direction, the pins 25 determining the positions of the slide film F in the right-and-left direction, and the upper and lower edges of the recessed portions 23 determining the position in the up-and-down direction.

The windows 26L, 26R of the front-side mount frame 21 are surrounded by the protruded portions 27 that correspond to the recessed portions 23 of the back-side mount frame 22. The protruded portions 27 are fitted to the recessed portions 23, so that the pins 25 of the recessed portions 23 are forcibly introduced into the holes 28 in the protruded portions 27. According to this embodiment, the length of the pins 25 and the depth of the holes 28 are more increased than those shown in FIG. 1 to further reinforce the joining force.

FIG. 3 illustrates a stereo slide mount in which a front-side mount frame 31 and a back-side mount frame 32 are formed as a unitary structure, the two being coupled together via a thin hinge portion 33. Upper, lower, right and left windows 34R, 34L, 35R and 35L are surrounded by protruded portions 36 and recessed portions 37 like those of the stereo slide mount of FIG. 2. Pins 38 for joining the front-side and back-side mount frames are provided at three places, i.e., left end, central portion and right end at the upper edge of the junction surface of the front-side mount frame 31, and holes 39 are formed in the lower edge of the back-side mount frame 32 at positions symmetrical to the pins 38 with the hinge portion 33 as an axis of symmetry.

The front-side and back-side mount frames 31 and 32 are joined together relying upon these pins 38 and holes 39. In this case, the numbers of the positioning pins 40 and holes 41 at the portions for placing the file are decreased compared to those of FIG. 2, i.e., decreased to one pin and one hole for each window. However, there is no limitation in their numbers.

Though the embodiments have dealt with stereo slide mounts for 35 mm films, it should be noted that the invention can be also adapted even to modified stereo slide mounts to meet films of various sizes having perforations other than those of the 35 mm films.

As described above, the stereo slide mount of the present invention is designed for stereo slides photographed by using a stereo camera capable of correcting parallax and in which the right and left slides are positioned maintaining a predetermined gap. Therefore, the user is prevented from incorrectly adjusting the gap and finds it easier to mount the slides than using the conventional stereo slide mounts, making it possible to correctly reproduce the solid effect equal to the one at the time of taking a picture.

By using the stereo slide mount of one embodiment having windows larger than the screen regions, furthermore, it is allowed to view the whole screen regions of the stereo slides photographed by using the stereo camera, without losing areas in the right and left images.

I claim:

1. A stereo slide mount in which the peripheral edges of slide films having screens are held from both the front and back surfaces by a pair of front-side and back-side mount frames having two rectangular windows which are formed in parallel to hold two pieces of the slide films, wherein pins are provided on one film-holding surface of the pair of mount frames to engage with perforations of two pieces of the slide films to position the slide films maintaining a predetermined gap, holes are formed in the film-holding surface of the other mount frame to correspond to said pins, and the pins and the holes of the front-side and back-side mount frames are fitted to each other to hold the slide films.

2. A stereo slide mount according to claim 1, wherein the windows have vertical and lateral sizes which are larger than the size of the screens of the slide films, so that unexposed portions along the edges of the screens of said slide films are exposed.

3. A stereo slide mount for holding a pair of stereo slide films each having a photographed screen region and perforations along two parallel edges comprising:

a front-side mount frame having a first two windows formed in parallel, each of the first two windows having vertical and lateral sizes which are slightly greater than the photographed screen region of the pair of stereo slide films;

a plurality of pins surrounding the first two windows, said plurality of pins positioned so as to separate the photographed screen regions by a predetermined gap and bring a central point of each one of the first two windows into agreement with a central point of each of the photographed screen regions of the pair of stereo slide films; and a back-side mount frame having a second two windows formed in parallel, the second two windows corresponding to the first two windows in said front-side mount frame, said back-slide mount frame having holes therein corresponding to said plurality of pins and sized to hold said front-side mount frame and said back side mount frame together, whereby when the pair of stereo slide films are placed within the slide mount there is no loss in screen area and a picture can be viewed maintaining an optimum solid effect which is nearly equal to a picture viewed through a view-finder at the time of taking a picture.

4. A stereo slide mount as in claim 3 wherein:

said plurality of pins are positioned to be placed within the perforations of the pair of stereo slide films.

5. A stereo slide mount as in claim 3 further comprising:

a recess portion formed around each of the second two windows, and said plurality of pins are placed within said recess portion.

6. A stereo slide mount as in claim 3 wherein:

unexposed black portions of the pair of stereo slide films along peripheral edges of the photographed screen regions appear uniformly in the first two windows.

7. A stereo slide mount for holding a pair of stereo slide films each having a photographed screen region and perforations along two parallel edges comprising:

a front-side mount frame having a first two windows formed in parallel;

a protruding portion formed around each of the first two windows;

a back-side mount frame having a second two windows formed in parallel, the second two windows corresponding to the first two windows in said front-side mount frame, and having a recess portion formed around each of the second two windows, said recess portion having a vertical size equal to that of one of the pair of slide films and a lateral size longer than that of one of the pair of slide films, one positioning pin for each of the second two windows placed within the recess portion along a lateral edge;

a hole for each of the first two windows placed within the protruding portion sized to receive said one positioning pin;

a hinge portion connecting said back-side mount frame to said front-side mount frame; and a plurality of joining pins and joining holes placed on said front-side mount frame and said back-side mount frame for holding said front-side mount frame and said back-side mount frame together;

whereby when the pair of stereo slide films are placed within the slide mount there is no loss in screen area and a picture can be viewed maintaining an optimum solid effect which is nearly equal to a picture viewed through a view-finder at the time of taking a picture.

\* \* \* \* \*